(12) United States Patent
Tobias Granado (10) Patent No.: US 11,968,989 B2
(45) Date of Patent: Apr. 30, 2024

(54) AUTOMATED STATION FOR SALTING MEAT PIECES AND OPERATING METHOD THEREOF

(71) Applicant: Diseño y Construccion De Maquinaria Automatizada, S.L., Buñol (ES)

(72) Inventor: Jose Antonio Tobias Granado, Buñol (ES)

(73) Assignee: Diseño y Construccion De Maquinaria Automatizada, S.L., Buñol (ES)

( * ) Notice: Subject to any disclaimer, the term of this patent is extended or adjusted under 35 U.S.C. 154(b) by 294 days.

(21) Appl. No.: 17/177,260

(22) Filed: Feb. 17, 2021

(65) Prior Publication Data

US 2021/0244038 A1 Aug. 12, 2021

Related U.S. Application Data

(63) Continuation of application No. PCT/ES2020/070083, filed on Feb. 6, 2020.

(51) Int. Cl.
 *A23B 4/02* (2006.01)
 *A22C 9/00* (2006.01)
 (Continued)

(52) U.S. Cl.
 CPC .............. *A23B 4/325* (2013.01); *A22C 9/001* (2013.01); *A22C 17/0053* (2013.01);
 (Continued)

(58) Field of Classification Search
 CPC . A22C 9/001; A22C 17/0053; A22C 21/0053; A23B 4/02; A23B 4/023;
 (Continued)

(56) References Cited

U.S. PATENT DOCUMENTS

| 1,664,474 A | * | 4/1928 | Bailey | A23B 7/157 |
| | | | | 118/19 |
| 5,403,056 A | * | 4/1995 | Wallace | A22C 17/0093 |
| | | | | 294/98.1 |

(Continued)

FOREIGN PATENT DOCUMENTS

| EP | 3241441 A1 | * | 11/2017 | ............. A22B 7/001 |
| FR | 2507863 | * | 12/1982 | ............. A23B 4/325 |

(Continued)

OTHER PUBLICATIONS

International Search Report and the Written Opinion dated Nov. 2, 2020 From the International Searching Authority Re. Application No. PCT/ES2020/070083. (15 Pages).

*Primary Examiner* — Reginald Alexander (57) ABSTRACT

The invention relates to an automated station for salting meat pieces in a predetermined manner, enabling a method for salting poultry meat pieces to be automated, thus increasing productivity and thereby improving safety conditions. The station comprises motorised supply means for supplying meat pieces (P) in a forward direction, handling means for handling meat pieces in order to handle the meat piece coming from the supply means, salt supply means configured to provide salt on an inner and outer area of the meat piece (P), as well as a retrieval system for retrieving salt coming from the salt supply means.

9 Claims, 9 Drawing Sheets

(51) Int. Cl.
- *A22C 17/00* (2006.01)
- *A23B 4/32* (2006.01)
- *A23L 3/00* (2006.01)
- *A23L 3/358* (2006.01)
- *A23L 13/50* (2016.01)
- *B25J 9/00* (2006.01)
- *B25J 11/00* (2006.01)
- *A23B 4/023* (2006.01)
- *A23B 4/027* (2006.01)

(52) U.S. Cl.
CPC ............ *A22C 17/0093* (2013.01); *A23B 4/02* (2013.01); *A23L 3/001* (2013.01); *A23L 3/358* (2013.01); *A23L 13/57* (2016.08); *B25J 9/0093* (2013.01); *B25J 11/0045* (2013.01); *A23B 4/023* (2013.01); *A23B 4/027* (2013.01)

(58) Field of Classification Search
CPC .. A23B 4/027; A23B 4/10; A23B 4/28; A23B 4/285; A23B 4/305; A23B 4/325; A23L 27/40; A23L 13/57; A23L 13/03; A23L 3/001; A23L 3/3454

USPC .......................................................... 99/532
See application file for complete search history.

(56) References Cited

U.S. PATENT DOCUMENTS

| | | | |
|---|---|---|---|
| 5,472,722 A * | 12/1995 | Burger | A23B 4/32 |
| | | | 426/410 |
| 5,882,253 A | 3/1999 | Mostoller | |
| 2002/0034565 A1 * | 3/2002 | Theodorus van Esbroeck | A23B 4/28 |
| | | | 426/641 |
| 2006/0134283 A1 | 6/2006 | Fetterhoof et al. | |
| 2011/0104346 A1 | 5/2011 | Bowsman et al. | |
| 2019/0029277 A1 * | 1/2019 | Skrædderdal | A22C 17/002 |
| 2022/0072730 A1 * | 3/2022 | Bergmann | A22C 7/003 |

FOREIGN PATENT DOCUMENTS

| WO | WO 2007/067052 | 6/2007 |
|---|---|---|
| WO | WO 2014/040604 | 3/2014 |

* cited by examiner

AUTOMATED STATION FOR SALTING MEAT PIECES AND OPERATING METHOD THEREOF

RELATED APPLICATION

This application is a Continuation of PCT Patent Application No. PCT/ES2020/070083 having International filing date of Feb. 6, 2020, the contents of which are incorporated herein by reference in their entirety.

FIELD AND BACKGROUND OF THE INVENTION

The object of the present invention is to provide an automated station for salting meat pieces, more specifically, poultry meat pieces, and an operating method thereof.

More specifically, the invention proposes the development of an automated station for salting meat pieces in a predetermined manner, enabling a method for salting poultry meat pieces to be automated, thus increasing productivity and thereby improving safety conditions.

The present invention corresponds to the technical field of manufacturing and preparing food products, being of special application in the preparation of products according to the requirements established in Judaism.

During the handling of meat products, and more specifically, of chickens, kosher guidelines require the product to be preserved and treated with a coating of salt, on both the surface and in the inner cavities of each piece of chicken, in an individual manner, after the appropriate slaughtering operations have been performed.

These operations of thorough salting of each piece of chicken confer optimum preservation and sterilisation conditions to declare that the resulting meat product complies with Jewish dietary regulations.

These operations of salting each chicken in an individual manner are currently performed manually, by means of operators who come into direct contact with a salt bath, and handle the salt so that it impregnates the entirety of the outer area of each poultry meat piece, as well as the inner area thereof, through an orifice previously made, wherethrough the evisceration of the animal has been undertaken.

Consequently, this work station is highly critical for the operators in charge of the handling of meat pieces, as the constant handling of a salt bath fosters a series of relevant irritations and side effects, which affects directly the performance of the operators.

Furthermore, the applicant is currently unaware of an invention that has all the features described in this specification.

SUMMARY OF THE INVENTION

The present invention has been developed with the aim of providing an automated station which is configured as a novelty within the field of application and solves the aforementioned drawbacks, also contributing other additional advantages that will be obvious from the description below.

Therefore, an object of the present invention is to provide an automated station for salting meat pieces, characterised in that it comprises:
  motorised supply means for supplying meat pieces in a forward direction;
  handling means for handling meat pieces in order to handle the meat piece coming from the supply means;
  first salt supply means configured to inject salt in an inner area of the meat piece;
  second salt supply means configured to provide salt on the outer surface of the meat piece which include movement means to move the meat piece in a forward and/or rotating direction; and
  a retrieval system for retrieving salt coming from at least the second salt supply means.

Thanks to these features, an automated work station for treating poultry meat pieces is obtained, and more specifically, for the performing the salting operations of the outer surface and inner cavity of the meat piece, thereby avoiding the direct contact of the operators with the salt, and therefore minimising the possible pathologies suffered therefrom, in turn increasing productivity.

Preferably, the handling means comprise a gripping head coupled to a robot arm capable of moving on the three spatial coordinate axes (X, Y, Z).

Preferably, the first salt supply means comprise a first dispenser linked to a salt supply source.

Also preferably, the second salt supply means comprise a second upper dispenser and a container located beneath the second dispenser, inside of which has a pair of adjacent rollers that rotate in one same direction, intended to direct the meat piece in the forward direction.

Advantageously, the container presents a base which is on a plane inclined with respect to the horizontal plane of the ground level, which facilitates the downward movement of the salt towards an exit orifice to be later reused by the retrieval system.

According to another aspect of the invention, the aforementioned salt retrieval system can comprise a salt collection deposit located beneath the container of the second salt supply means, the collection deposit being connected to a feeding chute linked to the second dispenser, by means of a duct, and pumping means, such that it conveys a flow of salt from the container towards the feeding chute.

Preferably, the motorised supply means comprise a conveyor belt linked to the motor means, the conveyor belt having a plurality of dividers which define individual accommodations for the meat pieces and cribs for the lifting and correct positioning of the chickens in their respective accommodations.

Additionally, the robot arm is supported by a first support structure provided with adjustable positioning means a longitudinal axis.

Preferably, the positioning means comprise platens configured to be able to move along guide rails which facilitate the correct positioning of the robot arm in the station.

The automated station described therefore represents an innovative structure with structural and constituent features heretofore unknown for its intended purpose, reasons which, taken together with its usefulness, provide it with sufficient grounds for obtaining the requested exclusivity privilege.

Another object of the present invention is to provide an operating method for an automated station as that defined previously, which is characterised in that it comprises the following steps:
  introducing an amount of salt inside the meat piece through an orifice previously made in said meat piece by means of the first salt supply means;
  releasing the meat piece from the first salt supply means; and
  applying a layer of salt on the outer surface of the meat piece by means of the second salt supply means.

Preferably, the application of the salt layer over the entire surface is performed with the meat piece in motion. This movement of the meat piece can be a dual movement which is both rotary and of linear advancement, for instance, over an elongated container.

Other features and advantages of the automated station object of the present invention will become apparent from the description of a preferred but not exclusive embodiment illustrated by way of non-limiting example in the attached drawings, wherein:

DESCRIPTION OF SPECIFIC EMBODIMENTS OF THE INVENTION

In light of the aforementioned figures, and in accordance with the adopted numbering, one may observe therein an example of a preferred embodiment of the invention, which comprises the parts and elements indicated and described in detail below.

Figure 1:
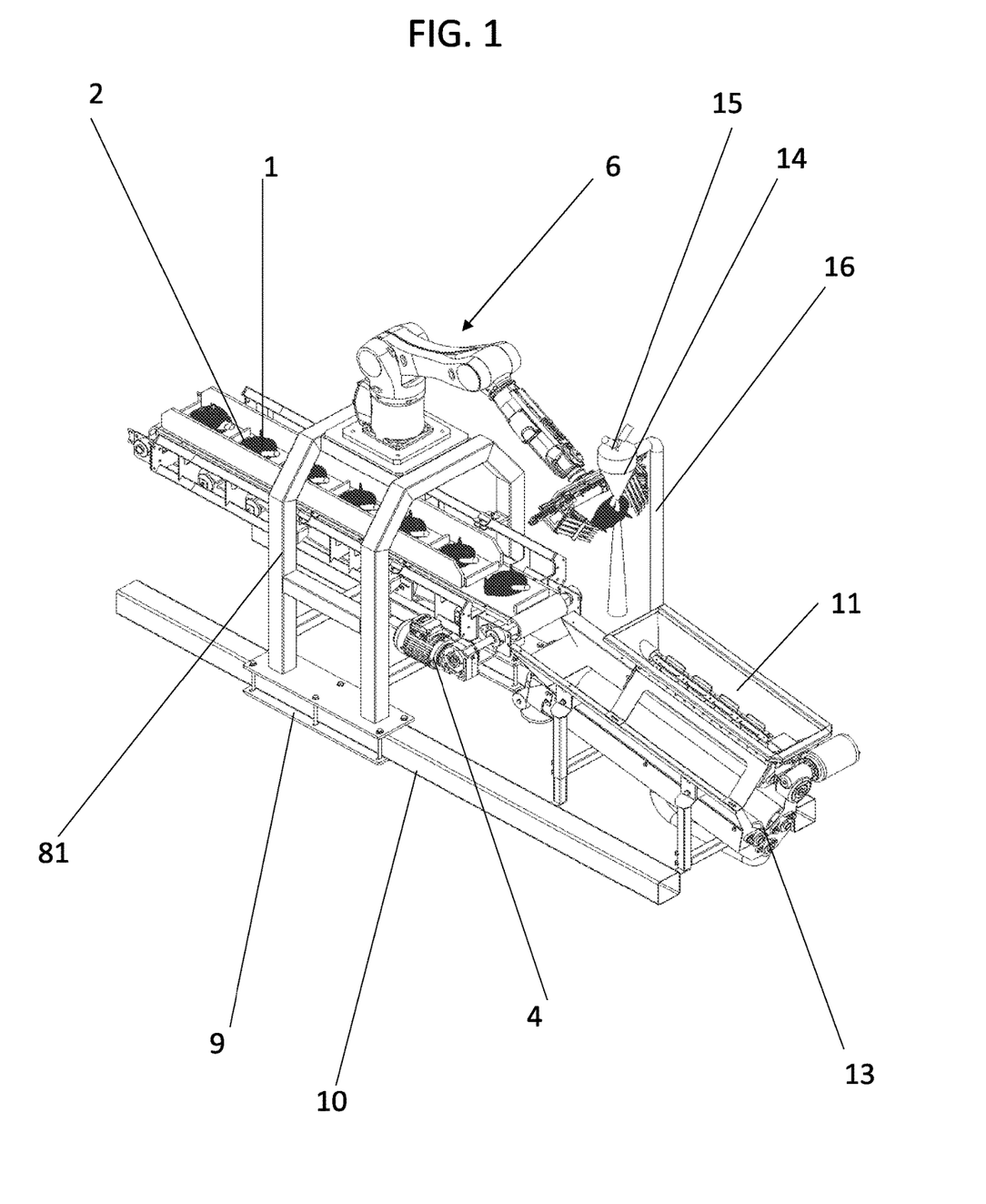
FIG. 1 is a perspective view of an automated salting station according to the present invention.
Figure 2:
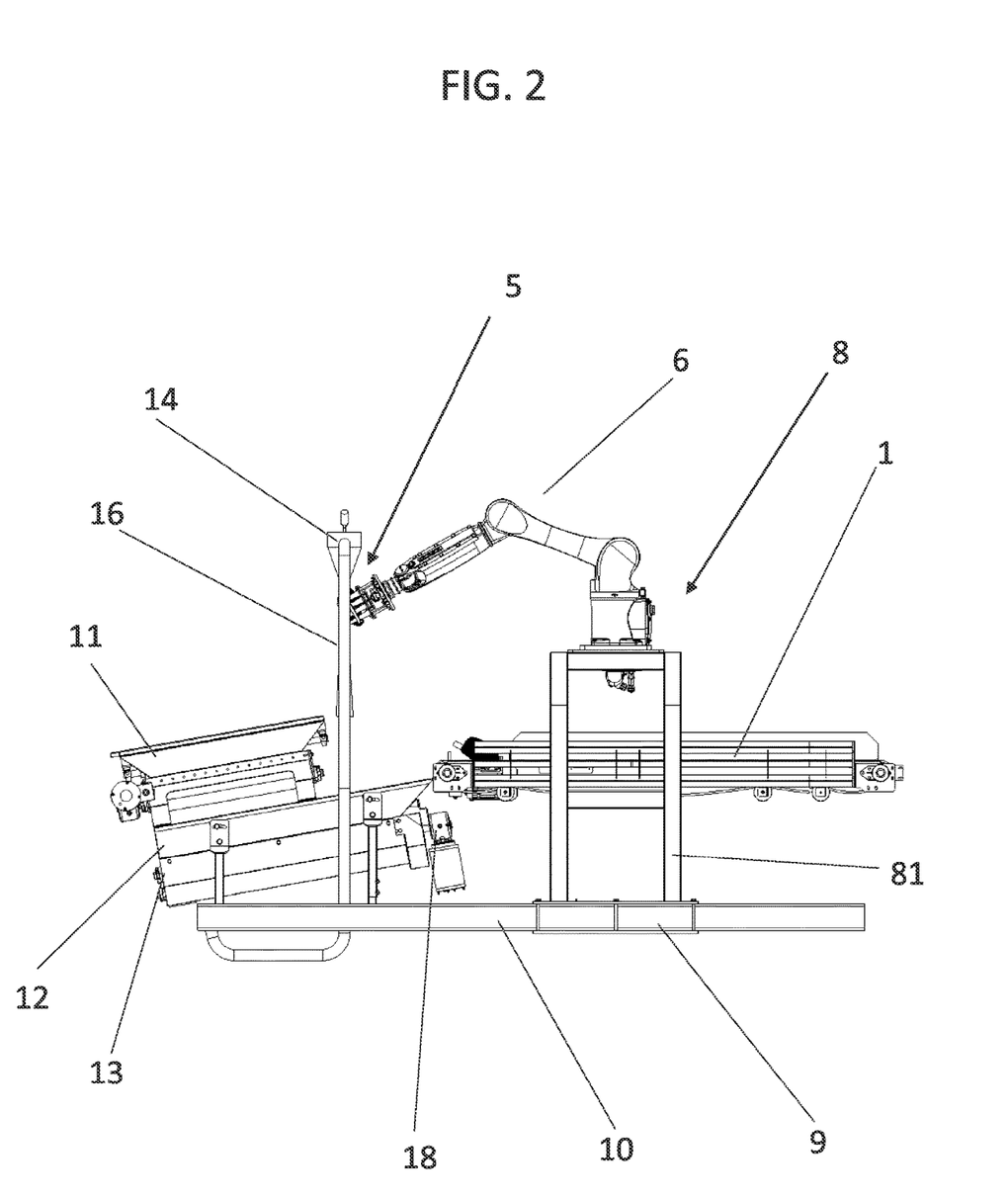
FIG. 2 is a side elevation view of the station of the invention shown in FIG. 1.
Figure 3:
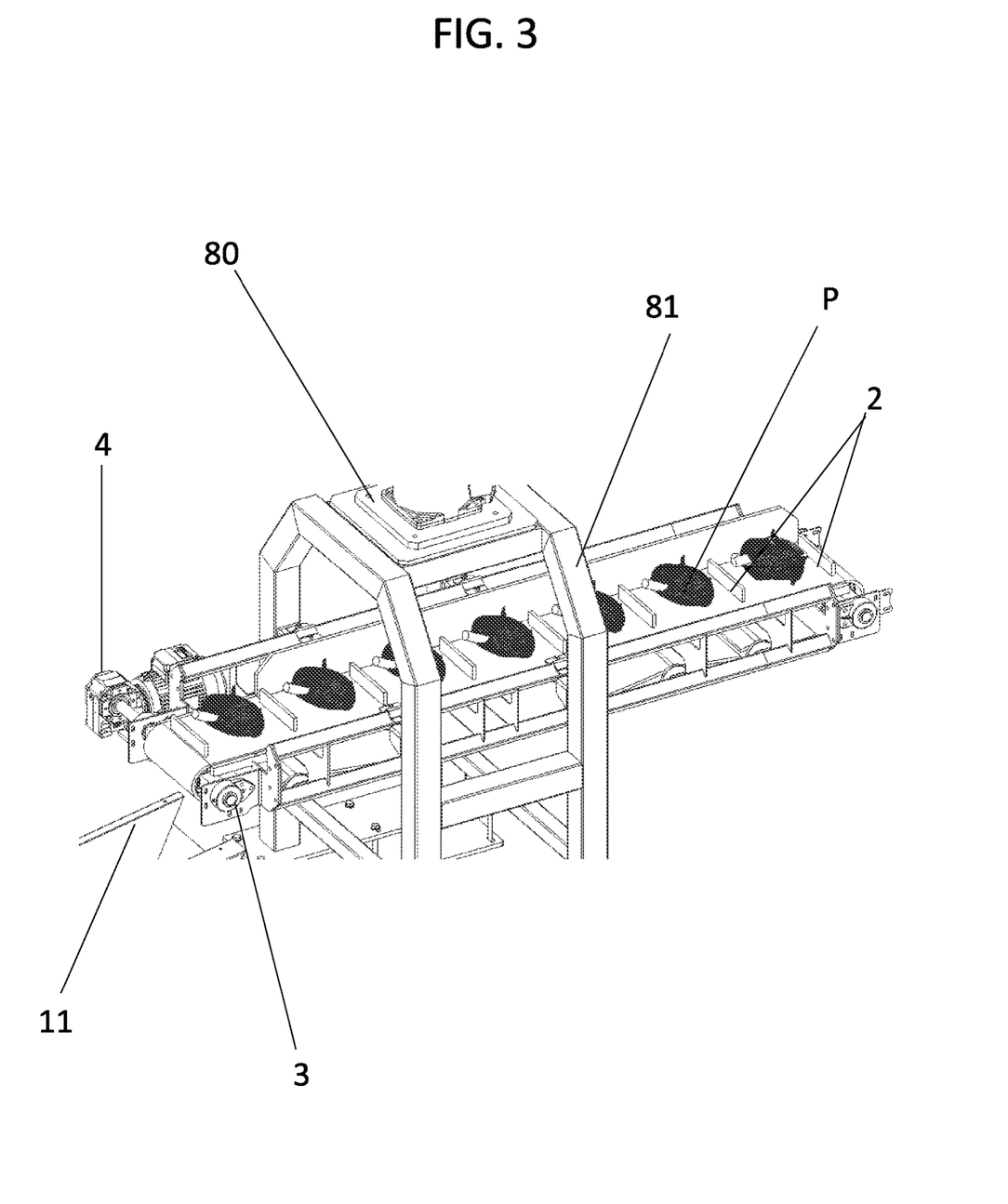
FIG. 3 is a detailed perspective view of the supply means.

An embodiment of the automated station for salting meat pieces, more specifically, chicken pieces, comprises motorised supply means for supplying meat pieces in a forward direction; which comprise a conveyor belt (1) that is linked to motor means, the conveyor belt (1) having a plurality of dividing panels (2) which are transversally arranged with respect to the longitudinal axis of the conveyor belt (1), which define individual accommodations for the meat pieces (P). The motor means comprise a pair of rollers located at both ends of the conveyor belt (1), one of the rollers being a driving roller (3) which is actuated with the aid of a servomotor (4).

The meat pieces can be fed manually or automatically on the conveyor belt (1), as necessary.

Figure 5:
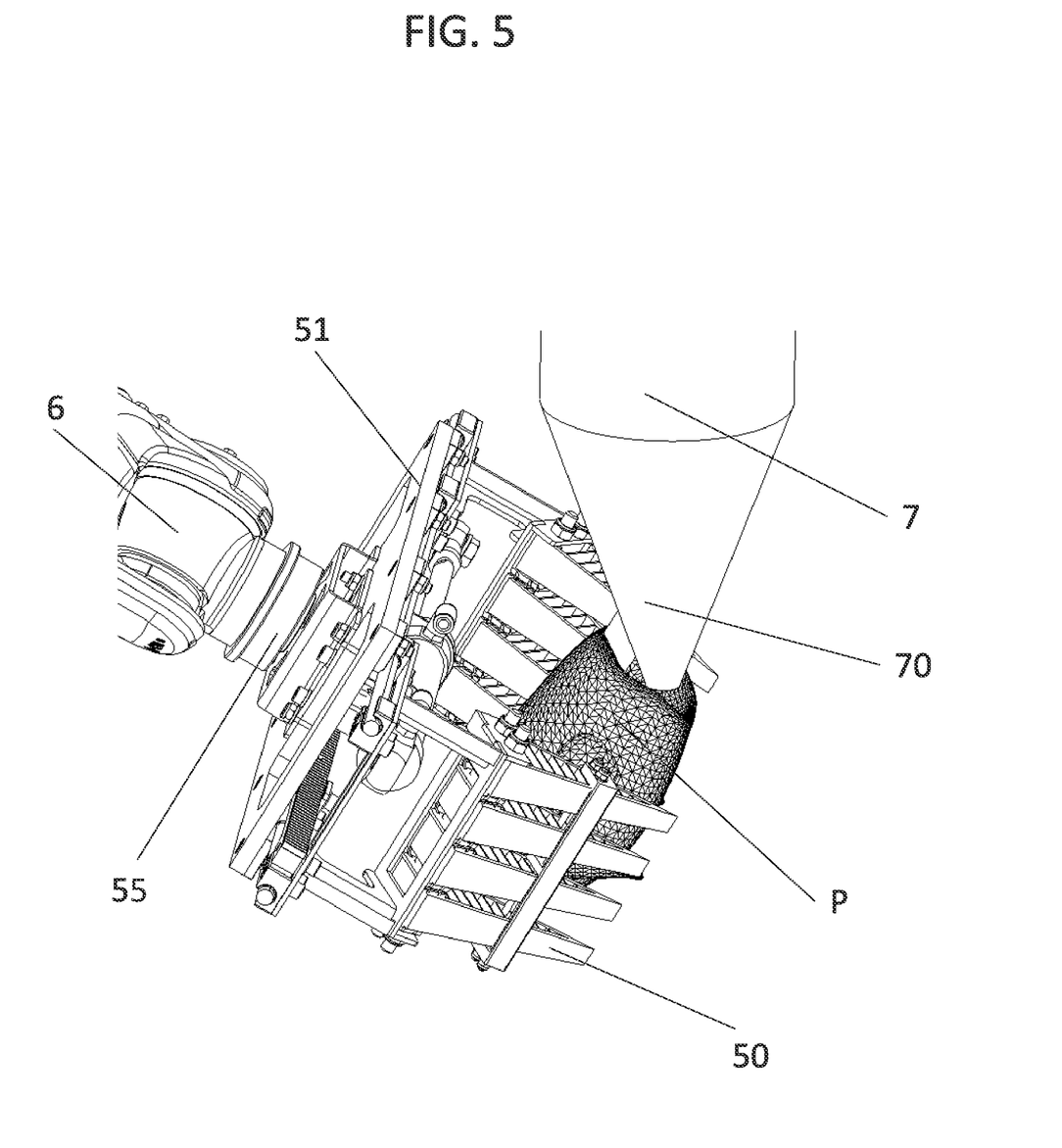
FIG. 5 is a detailed perspective view of the head present at the end of the robot arm during the operation of introducing salt inside the meat piece.
Figure 6:
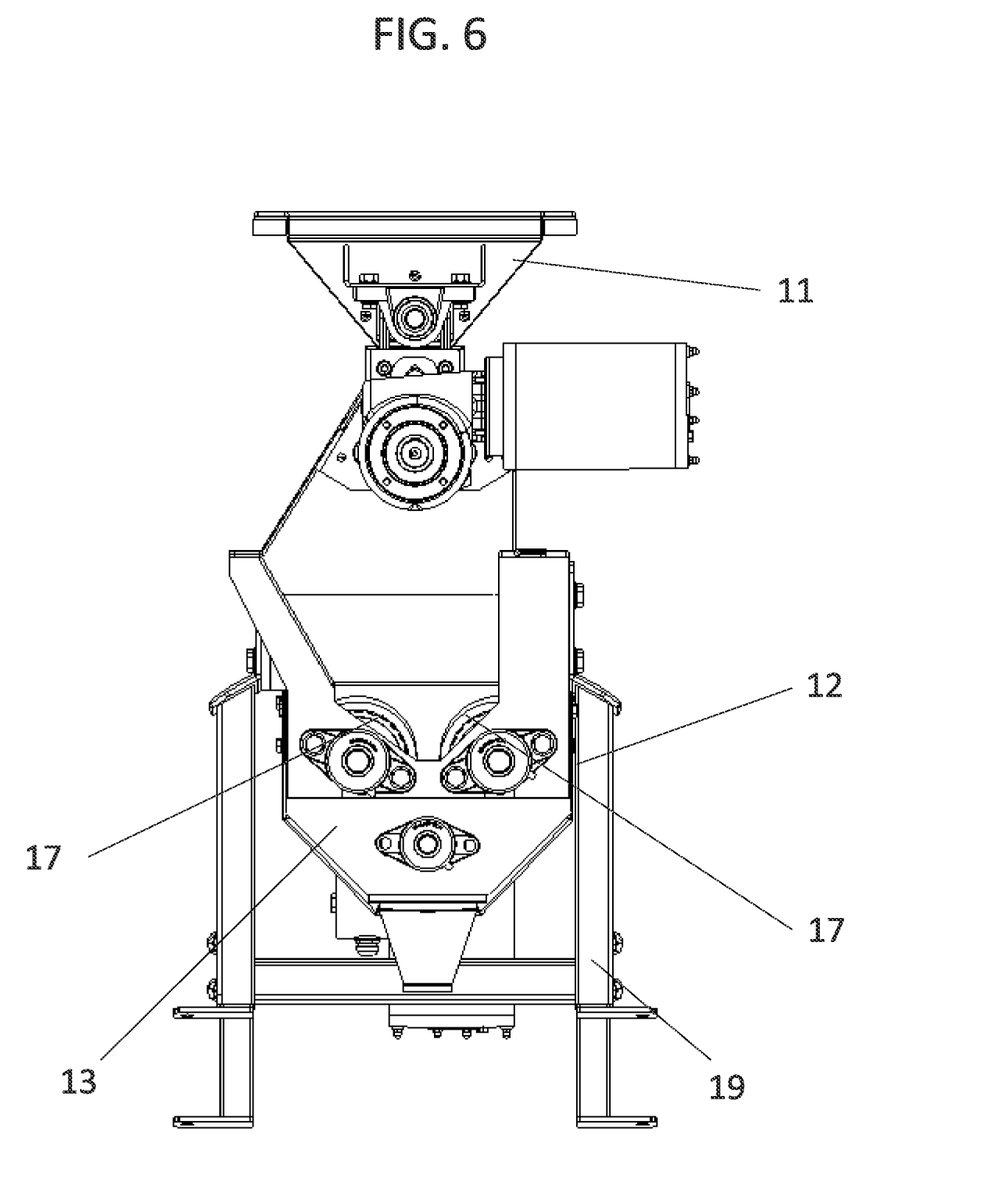
FIG. 6 is a partial side elevation view of a part of the station of the invention.

Once the chicken meat pieces are fed on the conveyor belt (1), and after a time of advancement of the meat piece and the stopping thereof, a rotating gripping head (5) coupled to an end of the robot arm (6), which can move on the three coordinate axes, extracts the meat piece from the conveyor belt (1) and places it beneath first salt supply means configured to inject salt in an inner area of the meat piece, as shown in FIG. 6. The gripping head (5) can comprise a set of clamps (50) facing each other, which can move in a guided manner axially over a platen (51) coupled to a rotating axis (55).

Figure 8:
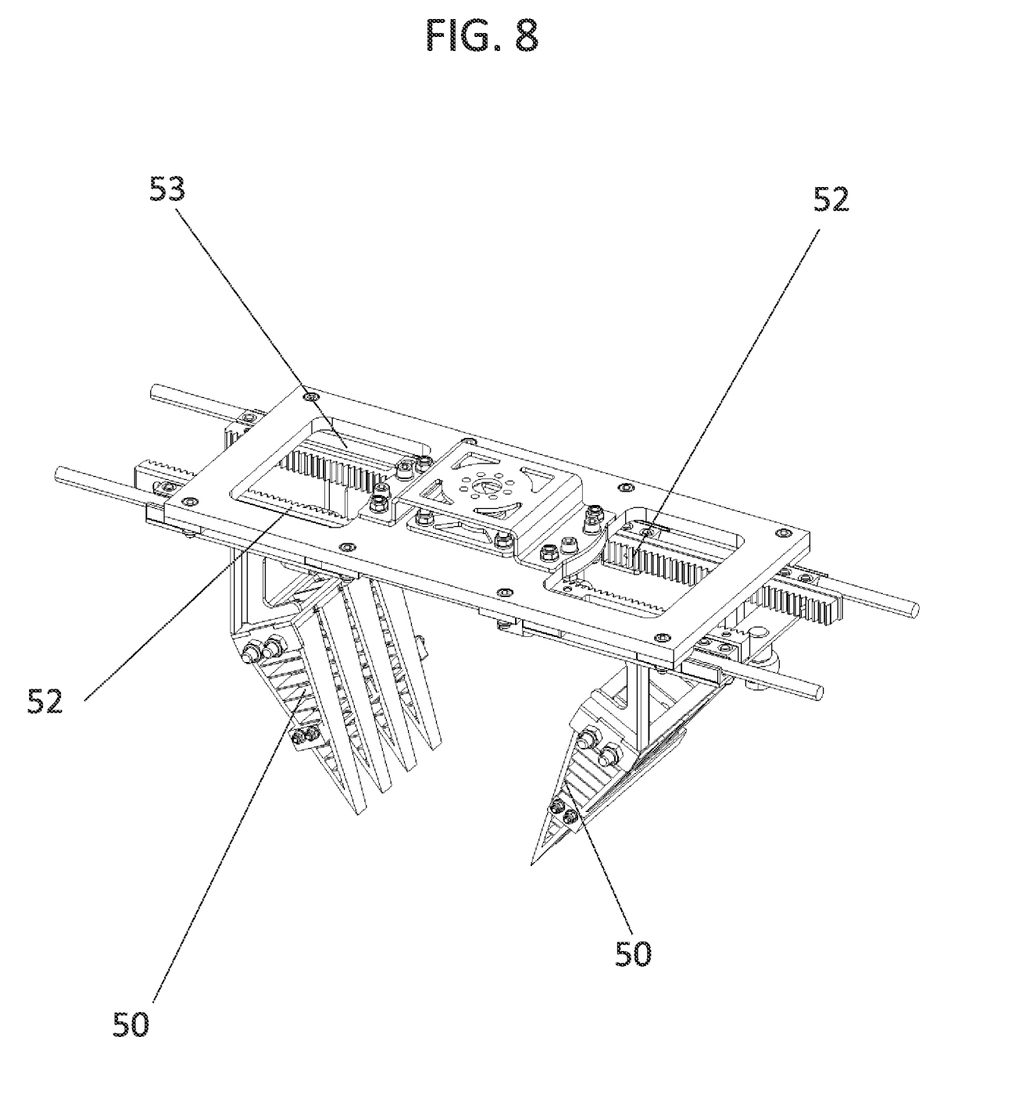
FIG. 8 is a detailed perspective view of the gripping head.
Figure 9:
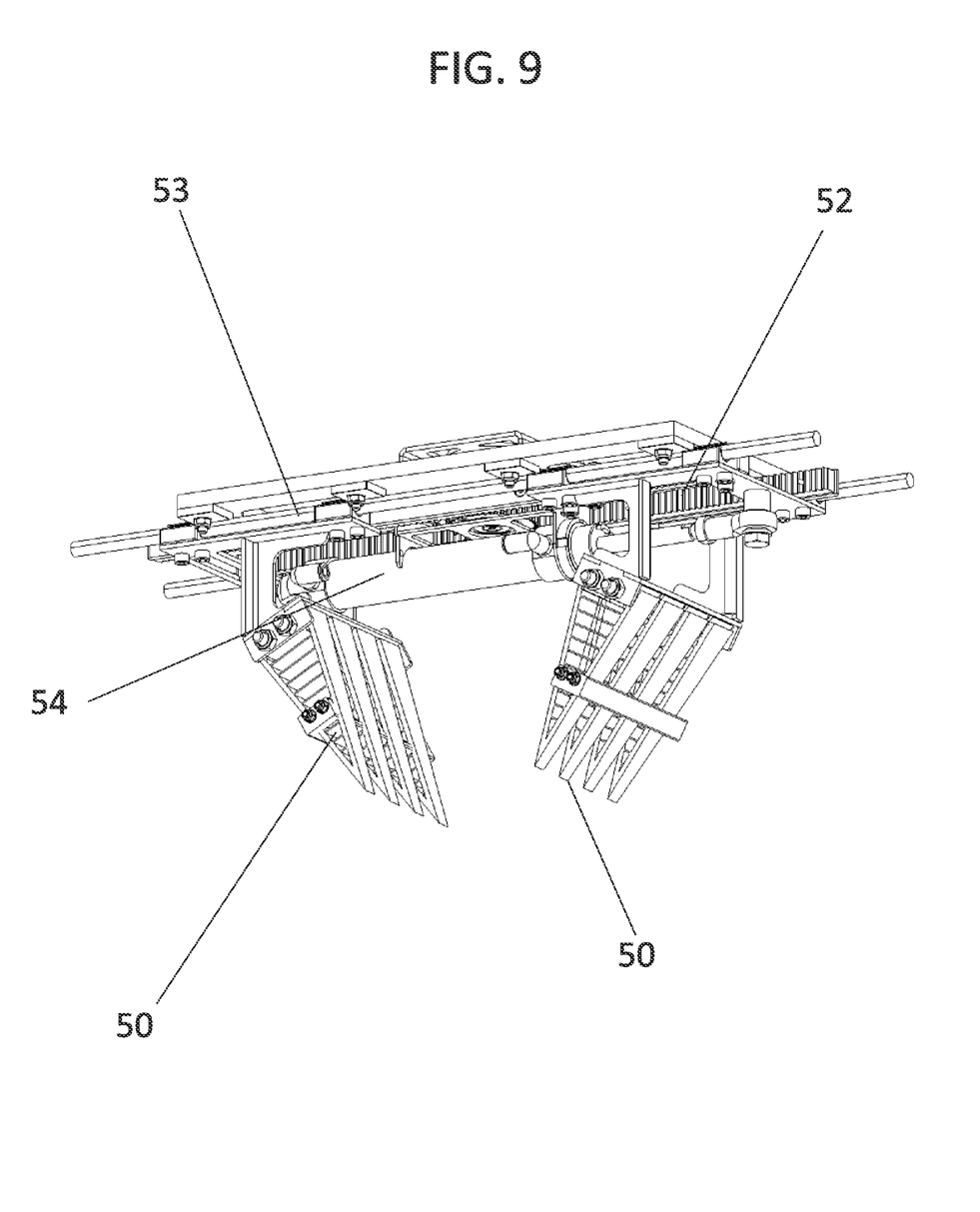
FIG. 9 is an additional detailed perspective view of the gripping head.

The clamps (50) are actuated by means of a rack and pinion mechanism which acts with the help of a pneumatic actuation system, as can be seen in FIGS. 8 and 9. In this manner, each clamp (50) is associated with a corresponding rack (52) which moves along a guide (53) by the action of a pneumatic cylinder (54), both racks (52) being synchronised with each other by means of the pinion located in a central position of the gripping head (5).

These first salt supply means comprise a first dispenser (7) linked (for instance, by means of connectors) to a salt supply source (not represented). This first dispenser (7) presents a tubular body which ends at a lower end having a frusto-conical-shaped narrowing (70), which facilitates the introduction of salt inside the meat piece (P).

Returning once more to the robot arm (6), it is supported by a first support structure, generally indicated with the reference (8), which is made up of a support plate (80) and a gantry structure (81), the lower part thereof including adjustable positioning means on a longitudinal axis of the salting station. As can be seen with greater clarity in FIG. 4, the gantry structure (81) includes crossbars (82) which provide greater rigidity to the very structure.

Figure 4:
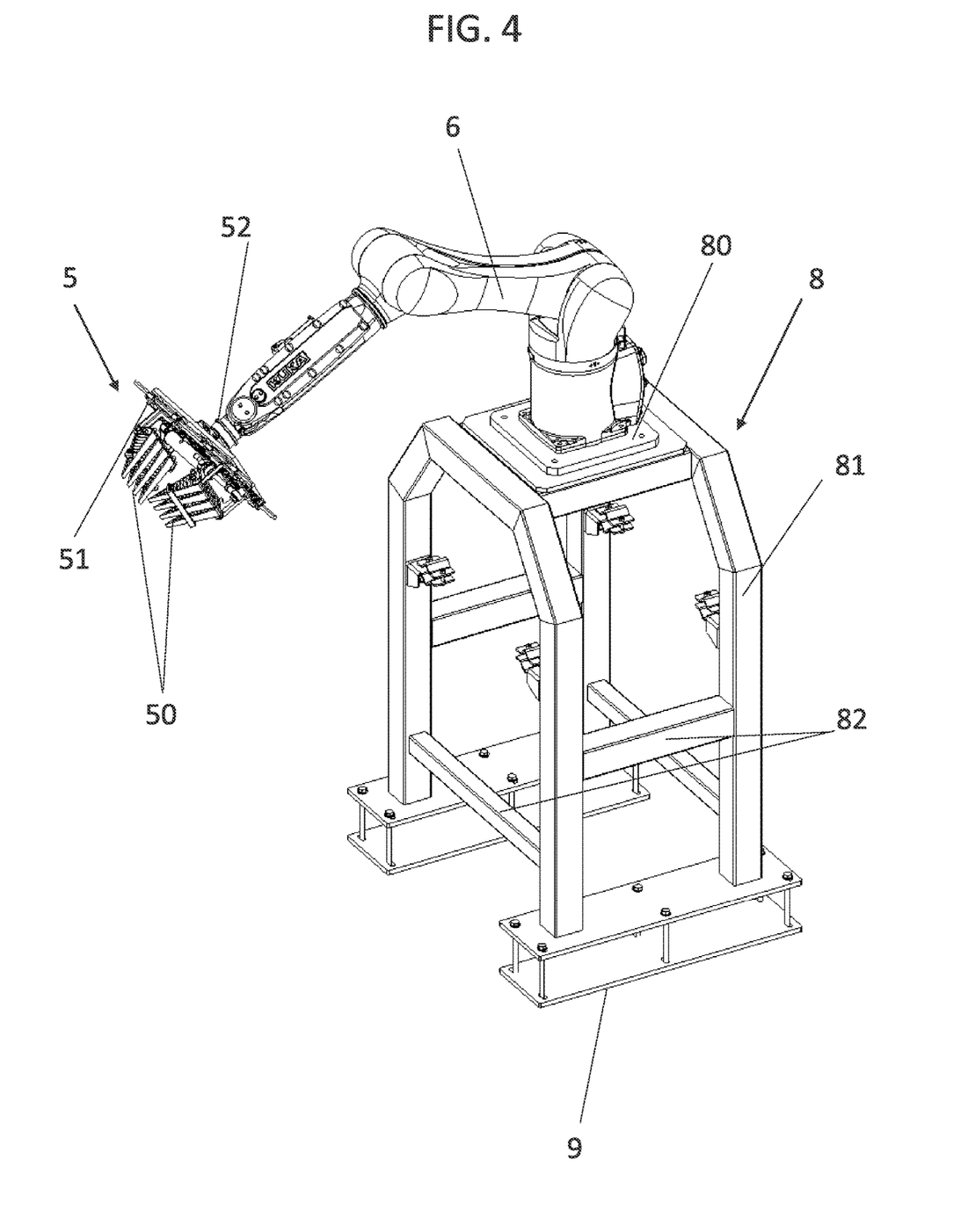
FIG. 4 is a detailed perspective view of the handling means for handling the salting station.

As can be seen, the aforementioned positioning means comprise a pair of lower platens (9) configured to be able to move and be fixed over guide rails (10) separated from each other, which run in parallel and are longitudinally arranged with respect to a longitudinal axis of the automated station.

Next, with the aid of the robot arm (6), the meat piece (P) is fed in second salt supply means configured to provide salt on the outer surface of the meat piece which includes movement means to move the meat piece (P) in a forward direction, which are described in greater detail below.

In order to take advantage of the salt that is not deposited on the meat piece (P), a retrieval system is provided for retrieving salt coming from at least the second salt supply means, which will be described below.

Figure 7:
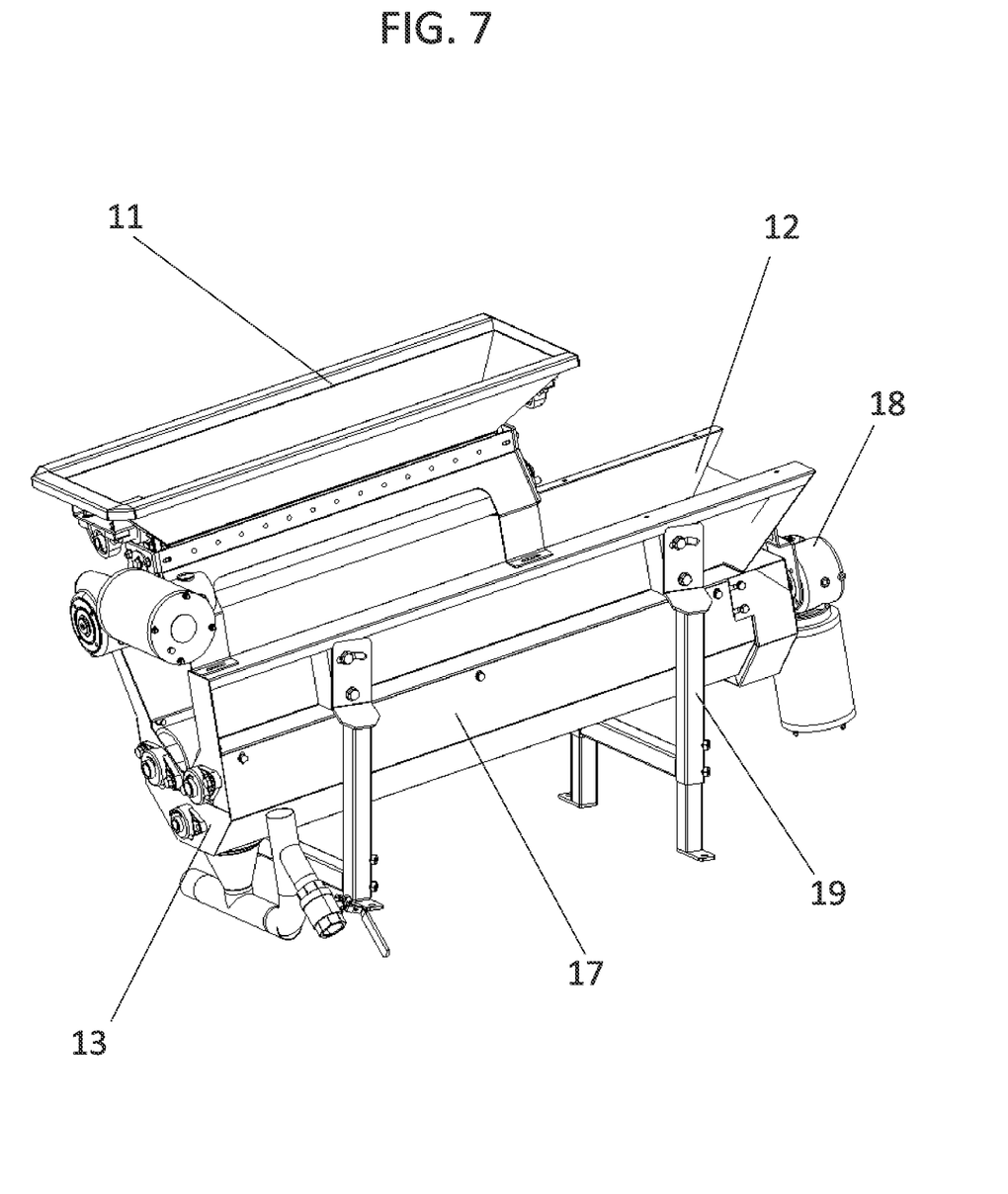
FIG. 7 is a perspective view of the second supply means and partially of the salt retrieval system.

As regards these second salt supply means, they comprise a second upper dispenser (11) which is located over the meat pieces and a container (12) located beneath the second upper dispenser (11), inside of which has a pair of rollers (17) adjacent to each other, which rotate in one same direction, intended to direct the meat piece in the forward direction, as can be seen in FIGS. 6 and 7. The rollers (17) are actuated by a motor means (18) located at one of the ends of the container (12). The second supply means include a second support structure, generally indicated with the reference (19), which is coupled to the second upper dispenser (11).

In order to facilitate the reuse of the excess salt, i.e., that which has not adhered to the surface of the poultry meat piece, the container (12) presents a base which is on a plane inclined with respect to the horizontal plane of the ground level.

Now, getting into more detail about the salt retrieval system, it comprises a salt collection deposit (13) located beneath the container (12) of the second salt supply means, the collection deposit being connected to a feeding chute (14) which is coupled to the second dispenser by means of a fixing structure (15). The feeding chute (14) is connected by means of a duct (16) which extends vertically upwards from the salt collection deposit (13), such that it conveys a flow of salt from the salt collection deposit (13) towards the feeding chute (14), aided by pumping means.

The details, shapes, dimensions and other complementary elements used in the manufacturing of the automated station of the invention may be suitably replaced with others that do not depart from the scope defined by the claims below.

What is claimed is:

1. An automated station for salting meat pieces, characterised in that it comprises:

motorised supply means for supplying meat pieces (P) in a forward direction;

handling means for handling meat pieces in order to handle the meat piece coming from the supply means;

first salt supply means configured to inject salt in an inner area of the meat piece (P);

second salt supply means configured to provide salt on the outer surface of the meat piece which include movement means to move the meat piece (P) in a forward and/or rotating direction; and a retrieval system for retrieving salt coming from at least the second salt supply means;

wherein the handling means comprise a gripping head (5), coupled to a robot arm (6), which can move on the three coordinate axes (X, Y, Z), and wherein the gripping head (5) comprises a pair of clamps (50), actuated by means of a rack and pinion mechanism which acts by means of a pneumatic actuation system, each clamp (50) being associated with a corresponding rack (52) which moves along a guide (53).

2. The automated station for salting meat pieces according to claim 1, characterised in that the first salt supply means comprise a first dispenser (7) linked to a salt supply source.

3. The automated station for salting meat pieces according to claim 2, characterised in that the second salt supply means comprise a second upper dispenser (11) and a container (12) located beneath the second upper dispenser (11), wherein an inside of the container (12) has a pair of rollers (17) adjacent to each other, which rotate in one same direction, intended to direct the meat piece in the forward direction.

4. The automated station for salting meat pieces according to claim 3, characterised in that the container (12) has a base which is in on a plane inclined with respect to the horizontal plane of the ground level.

5. The automated station for salting meat pieces according to claim 1, characterised in that the salt retrieval system comprises a salt collection deposit (13) located beneath a container of the second salt supply means, the collection deposit being connected. to a feeding chute (14) linked to a second dispenser, by means of a duct, and pumping means, such that it conveys a flow of salt from the container of the second salt supply means towards the feeding chute (14).

6. The automated station for salting meat pieces according to claim 1, characterised in that the motorised supply means comprise a conveyor belt (1) linked to motor means, the conveyor belt (1) having at least on one of the faces thereof a plurality of dividers (2) which define the individual accommodations for housing meat pieces (P).

7. The automated station for salting meat pieces according to claim 1, characterised in that the robot arm (6) is supported by a first support structure (8), provided with adjustable positioning means on a longitudinal axis.

8. The automated station for salting meat pieces according to claim 7, characterised in that the positioning means comprise platens (9) configured to he able to move along guide rails (10).

9. The automated station for salting meat pieces according to claim 4, characterised in that the first salt supply means comprise a first dispenser (7) which presents a tubular body which ends at a lower end having a frustoconical-shaped narrowing (70).

* * * * *